(12) United States Patent
Llaves et al.

(10) Patent No.: US 10,430,440 B2
(45) Date of Patent: Oct. 1, 2019

(54) APPARATUS PROGRAM AND METHOD FOR DATA PROPERTY RECOGNITION

(71) Applicant: Fujitsu Limited, Kawasaki-shi, Kanagawa (JP)

(72) Inventors: Alejandro Llaves, Madrid (ES); Manuel Peña Muñoz, Seville (ES); Victor De La Torre, Madrid (ES)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 15/679,296

(22) Filed: Aug. 17, 2017

(65) Prior Publication Data
US 2018/0113926 A1 Apr. 26, 2018

(30) Foreign Application Priority Data

Oct. 21, 2016 (DE) .......................... 10 2016 220 771

(51) Int. Cl.
*G06F 16/28* (2019.01)
*G06F 9/30* (2018.01)
(Continued)

(52) U.S. Cl.
CPC ........ *G06F 16/284* (2019.01); *G06F 9/30192* (2013.01); *G06F 16/215* (2019.01); *G06F 16/256* (2019.01); *G06F 16/9024* (2019.01); *G06N 5/04* (2013.01); *G06F 16/683* (2019.01); *G06K 9/00006* (2013.01); *H04N 5/765* (2013.01)

(58) Field of Classification Search
USPC ....................................................... 375/240
See application file for complete search history.

(56) References Cited

U.S. PATENT DOCUMENTS 4,068,300 A 1/1978 Bachman
6,961,736 B1 11/2005 Amirghodsi
(Continued)

FOREIGN PATENT DOCUMENTS

CA 2883922 A1 8/2011
CN 101262374 A 9/2008
(Continued)

OTHER PUBLICATIONS

US 9,299,346 B1, 03/2016, Hart et al. (withdrawn)
(Continued)

*Primary Examiner* — Wednel Cadeau
(74) *Attorney, Agent, or Firm* — Westerman, Hattori, Daniels & Adrian, LLP

(57) ABSTRACT

A data property recognition apparatus, includes a storage unit; a model data acquisition processor acquiring a plurality of model sets of data entries, each data entry individually representing an identified property common to the model set and being of a data type common to the model set; a feature vector generation processor receiving an input set of data entries, recognizing a data type common to the input set of data entries from among a plurality of supported data types, selecting a set of statistical characteristics representing the input set of data entries in dependence upon the recognised data type, generating a value of each of the selected set of statistical characteristics from the input set of data entries, and outputting a feature vector composed of the generated values of statistical characteristics.

10 Claims, 7 Drawing Sheets

(51) Int. Cl.
*G06F 16/901* (2019.01)
*G06N 5/04* (2006.01)
*G06F 16/25* (2019.01)
*G06F 16/215* (2019.01)
*G06K 9/00* (2006.01)
*H04N 5/765* (2006.01)
*G06F 16/683* (2019.01)

(56) References Cited

U.S. PATENT DOCUMENTS

| | | | |
|---|---|---|---|
| 7,433,835 B2 | 10/2008 | Frederick et al. | |
| 7,584,152 B2 | 9/2009 | Gupta et al. | |
| 7,617,174 B2 | 11/2009 | Chen et al. | |
| 7,734,515 B1 | 6/2010 | Frederick et al. | |
| 7,912,763 B1 | 3/2011 | Frederick et al. | |
| 8,019,652 B1 | 9/2011 | Frederick et al. | |
| 8,019,653 B1 | 9/2011 | Frederick et al. | |
| 8,036,261 B2 | 10/2011 | Tsutsui et al. | |
| 8,312,426 B2 | 11/2012 | Bouillet et al. | |
| 8,391,590 B2 | 3/2013 | Yalla et al. | |
| 8,788,269 B2 | 7/2014 | Stifelman et al. | |
| 9,064,006 B2 | 6/2015 | Hakkani-Tur et al. | |
| 9,268,617 B1 | 2/2016 | Croteau et al. | |
| 9,299,331 B1 | 3/2016 | Durham et al. | |
| 2002/0083060 A1 | 6/2002 | Wang et al. | |
| 2004/0107821 A1 | 6/2004 | Alcalde et al. | |
| 2005/0060350 A1 | 3/2005 | Baum et al. | |
| 2005/0165656 A1 | 7/2005 | Frederick et al. | |
| 2005/0177372 A1 | 8/2005 | Wang et al. | |
| 2006/0013451 A1 | 1/2006 | Haitsma | |
| 2006/0136428 A1 | 6/2006 | Syeda-Mahmood | |
| 2006/0206883 A1 | 9/2006 | Sabbouh | |
| 2008/0208855 A1* | 8/2008 | Lingenfelder | G06F 16/283 |
| 2009/0277322 A1 | 11/2009 | Cai et al. | |
| 2011/0314375 A1 | 12/2011 | Zaika et al. | |
| 2012/0016678 A1 | 1/2012 | Gruber et al. | |
| 2013/0019285 A1 | 1/2013 | Barborak et al. | |
| 2013/0054244 A1 | 2/2013 | Bao et al. | |
| 2013/0097320 A1 | 4/2013 | Ritter et al. | |
| 2013/0117207 A1 | 5/2013 | Kim et al. | |
| 2013/0144876 A1 | 6/2013 | Mehanna et al. | |
| 2013/0151451 A1 | 6/2013 | Lee et al. | |
| 2013/0246454 A1 | 9/2013 | Menten | |
| 2013/0275164 A1 | 10/2013 | Gruber et al. | |
| 2013/0311997 A1 | 11/2013 | Gruber et al. | |
| 2014/0149104 A1 | 5/2014 | Kim et al. | |
| 2014/0201629 A1 | 7/2014 | Heck | |
| 2014/0280616 A1 | 9/2014 | Ramanathan et al. | |
| 2014/0310127 A1 | 10/2014 | Hoch et al. | |
| 2014/0337358 A1* | 11/2014 | Mitra | G06N 5/041 707/748 |
| 2014/0337814 A1 | 11/2014 | Kalns et al. | |
| 2014/0344439 A1 | 11/2014 | Kempf et al. | |
| 2014/0365885 A1 | 12/2014 | Carson et al. | |
| 2015/0245216 A1 | 8/2015 | Cohen et al. | |
| 2015/0271276 A1 | 9/2015 | Edlund et al. | |
| 2015/0348554 A1 | 12/2015 | Orr et al. | |
| 2015/0382079 A1 | 12/2015 | Lister et al. | |
| 2016/0026680 A1 | 1/2016 | Banerjee et al. | |
| 2016/0026913 A1 | 1/2016 | Moon et al. | |
| 2016/0044380 A1 | 2/2016 | Barrett | |
| 2016/0048771 A1 | 2/2016 | Chen et al. | |
| 2016/0062604 A1 | 3/2016 | Kraljic et al. | |
| 2016/0063874 A1 | 3/2016 | Czerwinski et al. | |
| 2016/0063989 A1 | 3/2016 | Deleeuw | |
| 2016/0063998 A1 | 3/2016 | Krishnamoorthy et al. | |
| 2016/0070580 A1 | 3/2016 | Johnson et al. | |
| 2016/0140172 A1 | 5/2016 | Bornea et al. | |
| 2017/0006116 A1 | 1/2017 | Kelly et al. | |

FOREIGN PATENT DOCUMENTS

| | | |
|---|---|---|
| CN | 103038738 A | 4/2013 |
| CN | 104202416 A | 12/2014 |
| CN | 105164719 A | 12/2015 |
| CN | 105357143 A | 2/2016 |
| DE | 102012019178 A1 | 4/2013 |
| EP | 2325837 A2 | 5/2011 |
| EP | 2618280 A1 | 7/2013 |
| EP | 2704029 A1 | 3/2014 |
| EP | 2894587 A1 | 7/2015 |
| EP | 3041198 A1 | 7/2016 |
| GB | 2495222 A | 4/2013 |
| IN | 7309DEN2014 A | 4/2015 |
| IN | 359CH2013 A | 8/2015 |
| KR | 10-2012-0052610 A | 5/2012 |
| KR | 10-2013-0050707 A | 5/2013 |
| KR | 10-2013-0064960 A | 6/2013 |
| KR | 10-2014-0066640 A | 6/2014 |
| TW | 201543243 A | 11/2015 |
| TW | 201544974 A | 12/2015 |
| TW | 201545504 A | 12/2015 |
| WO | 2004/107217 A1 | 12/2004 |
| WO | 2008/015417 A1 | 2/2008 |
| WO | 2015/191965 A2 | 12/2015 |
| WO | 2016/105624 A1 | 6/2016 |

OTHER PUBLICATIONS

European Search Report dated Aug. 17, 2017, issued in counterpart European Application No. 16206620.3 (9 pages).
Ferrara et al., "Automatic Identity Recognition in the Semantic Web," International Workshop on Identity and Reference on the Semantic Web, vol. 422. CEUR, 2008 (15 pages).
Cornillon et al., "OPeNDAP: Accessing Data in a Distributed, Heterogeneous Environment," Data Science Journal, vol. 2, Nov. 5, 2003, pp. 164-174.
Bremm et al., "Assisted Descriptor Selection Based on Visual Comparative Data Analysis," Computer Graphics Forum, vol. 30, No. 3, 2011 (10 pages).
Wang, "An Industrial-Strength Audio Search Algorithm," ISMIR, vol. 2003, Oct. 2003 (7 pages).
Boutemedjet et al., "Unsupervised Feature Selection for Accurate Recommendation of High-Dimensional Image Data," Advances in Neural Information Processing Systems, 2008 (8 pages).
"UCI Machine Learning Repository: Corel Image Features Data Set," https://archive.ics.uci.edu/ml/support/Corel +Image+Features [accessed Jun. 2, 2017] (3 pages).
"TechTC—Technion Repository of Text Categorization Datasets," http://techtc.cs.technion.ac.il/ [acccessed Jun. 2, 2017] (7 pages).
Ison et al., "Tools and data services registry: a community effort to document bioinformatics resources," Nucleic Acids Research, 2016, vol. 44, Nov. 2015, D38-D47.
Maleshkova et al., "Supporting the creation of semantic RESTful service descriptions," The Open University, 8th International Semantic Web Conference (ISWC 2009), Oct. 2009 (15 pages).
Prud'Hommeaux et al., "SPARQL Query Language for RDF," W3C Recommendation Jan. 15, 2008 (74 pages).
Fielding et al., "Architectural Styles and the Design of Network-based Software Architectures," Doctoral dissertation: University of California, Irvine, 2000 (180 pages).
Zur Muehlen et al., "Developing web services choreography standards—the case of REST VS. SOAP," Decision Support Systems, vol. 40, No. 1, pp. 9-29 (2005).
Arenas et al., "A Direct Mapping of Relational Data to RDF," W3C Recommendation Sep. 27, 2012 (11 pages).
Holzschuher et al., "Performance of Graph Query Languages: Comparison of Cypher, Gremlin and Native Access in Neo4j," Proceedings of the Joint EDBT/ICDT 2013 Workshops, ACM, 2013 (10 pages).
Vinoski, "RESTful Web Services Development Checklist," IEEE Internet Computing 12.6 (2008) (3 pages).
Mora et al., "Engineering optimisations in query rewriting for OBDA," Proceedings of the 9th International Conference on Semantic Systems, 2013, pp. 41-48.
Mora et al., "kyrie2: Query Rewriting under Extensional Constraints in ELHIO," International Semantic Web Conference, 2014, pp. 568-583.

(56) References Cited

OTHER PUBLICATIONS

Thakkar et al., "Composing, Optimizing, and Executing Plans for Bioinformatics Web Services," The VLDB Journal, vol. 14, No. 3, pp. 330-353, Sep. 2005.
Richardson et al., "RESTful Web Services," O'Reilly Media, Inc., May 2007 (448 pages).
Akkiraju et aL, "Web Service Semantics—WSDL-S," Kno.e.sis Publications, Apr. 2005, available at http://corescholar.libraries.wright.edu/knoesis/69 (44 pages).
Chappell, "Enterprise Service Bus," O'Reilly Media, Inc., 2004, pp. 43-59.
Christensen et al., "Web Services Description Language (WSDL) 1.1," W3C Note Mar. 15, 2001 (27 pages).
Curbera et al., "Unraveling the Web Services Web: An Introduction to SOAP, WSDL, and UDDI," IEEE Internet Computing 6.2 (Mar. 2002), pp. 86-93.
Davis et al., "The Definitive Guide to Linux Network Programming," Apress, 2004, pp. 99-135.
Fitzner et al., "Functional description of geoprocessing services as conjunctive datalog queries," Geoinformatica 15.1 (Oct. 9, 2009), pp. 191-221.
Hofmann, "Syntax and Semantics of Dependent Types," Extensional Constructs in Intensional Type Theory, 1997, pp. 13-54.
Kopecky et al., "hRESTS: an HTML Microformat for Describing RESTful Web Services," Web Intelligence and Intelligent Agent Technology, 2008. WI-IAT'08. IEEE/WIC/ACM International Conference on. vol. 1. IEEE, Dec. 2008, pp. 619-625.
Kopecky, "Web Services Description Language (WSDL) Version 2.0: RDF Mapping," W3C Working Group Note Jun. 26, 2007 (39 pages).
Laskey et al., "Service oriented architecture," Wiley Interdisciplinary Reviews: Computational Statistics 1.1, Jul. 2009, pp. 101-105.
Martin et al., "OWL-S: Semantic Markup for Web Services," W3C Member Submission Nov. 22, 2004 (28 pages).
Newman, "Building Microservices: Designing Fine-Grained Systems," O'Reilly Media, Inc., 2015 (473 pages).
Pedrinaci et al., "Adaptive Service Binding with Lightweight Semantic Web Services," Service Engineering, Springer Vienna, 2011, pp. 233-260.
Perrey et al., "Service-oriented architecture," Proceedings of 2003 Symposium on Applications and the Internet Workshops, IEEE, 2003, pp. 116-119.
Sheth et al., "Semantics Enhanced Services: METEOR-S, SAWSDL and SA-REST," Wright State University, Bulletin of the Technical Committee on Data Engineering 31.3 (Sep. 2008), pp. 8-12.
Thönes, "Microservices," IEEE Software 32.1 (Jan. 2015), pp. 113-116.
Vitvar et al., "WSMO-lite annotations for web services," The Open University, the 5th Annual European Semantic Web Conference (ESWC 2008), Jun. 2008 (17 pages).
Yu et al., "Developing RDF-based Web services for supporting runtime matchmaking and invocation," 7th International Conference on Next Generation Web Services Practices (NWeSP 2011), Oct. 2011 (7 pages).
Abadi et al., "TensorFlow: Large-Scale Machine Learning on Heterogeneous Distributed Systems," arXiv:1603.04467 v2 [cs.DC] (Mar. 16, 2016) (19 pages).
Bahrampour et al., "Comparative Study of Caffe, Neon, Theano, and Torch for Deep Learning," arXiv:1511.06435v2 [cs.LG] (Jan. 4, 2016) (12 pages).
Barber, "This is why the world needs Facebook M: Its new AI and people-powered virtual personal assistant in Messenger app could be better than Apple Siri, Microsoft Cortana and Google Now," CITY A.M., http://www.cityam.com/223196/why-world-needs-facebook-m-its-new-ai-and-people-powered-virtual-personal-assistant-messenger [accessed May 16, 2017] (11 pages).
Bergstra et al., "Theano: Deep Learning on GPUs with Python," Journal of Machine Learning Research 1 (2011), (4 pages).
Bezanson et al., "Julia: A Fast Dynamic Language for Technical Computing," arXiv:1209.5145v1 [cs.PL] (Sep. 24, 2012) (27 pages).

Chen, "Siri, Alexa and Other Virtual Assistants Put to the Test," The New York Times, Jan. 27, 2016, https://www.nytimes.com/2016/01/28/technology/personaltech/siri-alexa-and-other-virtual-assistants-put-to-the-test.html [accessed May 16, 2017] (5 pages).
Morales et al., "SAMOA: Scalable Advanced Massive Online Analysis," Journal of Machine Learning Research 16.1 (2015), pp. 149-153.
Demšar et al., "Orange: Data Mining Toolbox in Python," Journal of Machine Learning Research 14.1 (2013), pp. 2349-2353.
Ghoting et al., "SystemML: Declarative Machine Learning on MapReduce," 2011 IEEE 27th International Conference on Data Engineering (ICDE), Apr. 2011, pp. 231-242.
Jia et al., "Caffe: Convolutional Architecture for Fast Feature Embedding," Proceedings of the 22nd ACM international conference on Multimedia, ACM, 2014, pp. 675-678.
Jones et al., "SciPy: Open Source Scientific Tools for Python," http://www.scipy.org/ [accessed May 4, 2016], archived on Internet Archive Wayback, Aug. 2, 2017, https://web.archive.org/web/20160504064330/http://www.scipy.org (3 pages).
Kamburugamuve et al., "Survey of Distributed Stream Processing for Large Stream Sources," Technical report (2013) (16 pages).
Kelly, "Which is the best digital assistant: Siri, Cortana, Alexa or Google Now?," CNN tech, Jul. 28, 2015 , http://money.cnn.com/2015/07/28/technology/digital-assistant-interview/index.html [accessed Apr. 26, 2017] (5 pages).
Search Report dated Aug. 2, 2017, issued in German Application No. 10 2016 220 778.4, with English translation (13 pages).
Kutter M: SOAP-WSDL-1.27. On the Internet <URL:>http://search.cpan.org/~mkutter/SOAP-WSDL-1.27/lib/SOAP/WSDL.pmzw. <http://web.archive.org/web/20150130084326/http://search.cpan.org/-mkutter/SOAP-WSDL-1.27/lib/SOAP/WSDLpm>; Cited in German Search Report dated Aug. 2, 2017.
Search Report dated Aug. 9, 2017, issued in German Application No. 10 2016 220 782.2, with English translation (14 pages).
Siddiqui et al., "Semantic-based On-demand Synthesis of Grid Activities for Automatic Workflow Generation", Third IEEE International Conference on e-Science and Grid Computing, IEEE Computer Society, 2007, pp. 43-50; ; Cited in German Search Report dated Aug. 9, 2017.
Badica et al., "Rule-based Distributed and Agent Systems", Rule-Based Reasoning, Programming, and Applications, 2011, p. 3-28; Cited in German Search Report dated Aug. 9, 2017.
Köhlbrugge, "An email app Don Draper would use: Turning your messy inbox into a list of actionable items," Medium, Apr. 28, 2014, https://medium.com/@marckohlbrugge/an-email-app-don-draper-would-use-1bccaf2b55b7 [accessed Apr. 26, 2017] (6 pages).
Lunden, "X.ai Lands $2.1M to Build 'Amy', An AI-Powered Personal Assistant for Meetings," TechCrunch, May 21, 2014, https://techcrunch.com/2014/05/21/x-ai-lands-2m-to-build-amy-an-ai-powered-personal-assistant-for-meetings/ [accessed Apr. 26, 2017] (6 pages).
McKinney, "pandas: a Foundational Python Library for Data Analysis and Statistics," Python for High Performance and Scientific Computing (2011), pp. 1-9.
McNeil, "Why Do I Have to Call This App 'Julie'?," The New York Times, Dec. 19, 2015, https://www.nytimes.com/2015/12/20/opinion/sunday/why-do-i-have-to-call-this-app-julie.html [accessed Apr. 26, 2017] (4 pages).
Modha et al., "Cognitive Computing," Communications of the ACM, Aug. 2011, vol. 54, No. 8, pp. 62-71.
McKinney, "Python for Data Analysis: Data wrangling with Pandas, NumPy, and Ipython," O'Reilly Media, Inc., 2012 (470 pages).
Owen et al., "Mahout in Action," Manning Publications Co., 2011 (12 pages).
Pedregosa et al., "Scikit-learn: Machine Learning in Python," Journal of Machine Learning Research 12 (2011), pp. 2825-2830.
Pérez et al., "IPython: A System for Interactive Scientific Computing," Computing in Science & Engineering 9.3 (May 2007) (9 pages).
Shoro et al., "Big Data Analysis: Ap Spark Perspective," Global Journal of Computer Science and Technology: C Software & Data Engineering, vol. 15, Issue 1, Version 1.0 (2015) (9 pages).

(56) References Cited

OTHER PUBLICATIONS

Shukla et al., "Big Data Frameworks: At a Glance," International Journal of Innovations & Advancement in Computer Science IJIACS, vol. 4, Issue 1, Jan. 2015, pp. 169-175.
Summerfield, "Programming in Python 3: A Complete Introduction to the Python Language," Addison-Wesley (2009) (644 pages).
White, "Hadoop: The Definitive Guide," O'Reilly Media, Inc. (2012) (647 pages).
Drumm et al., "QuickMig: Automatic Schema Matching for Data Migration Projects," Proceedings of the Sixteenth ACM Conference on Information and Knowledge Management (CIKM 2007), ACM, 2007, pp. 107-116, cited in Search Report of EP16205543.8.
Doan et al., "Reconciling Schemas of Disparate Data Sources: A Machine-Learning Approach," ACM SIGMOD May 21-24, 2001, ACM, 2001 (12 pages), cited in Search Report of EP16205543.8.
Khan et al., "A Survey of Mobile Cloud Computing Application Models," IEEE Communications Surveys & Tutorials, vol. 16, No. 1, First Quarter 2014, pp. 393-413, cited in Search Report of DE102016220777.6.
European Search Report dated May 10, 2017, issued in European Application No. 16205543.8 (15 pages).
European Search Report dated Jul. 4, 2017, issued in European Application No. 16204653.6 (10 pages).
German Search Report dated Jul. 17, 2017, issued in German Application No. 102016220777.6 (7 pages, including English abstract).

\* cited by examiner

FIGURE 6
| Earnings per share | Name | Closing price | |
|---|---|---|---|
| 100.81 | "Company A" | 12.7 | "2016-07-11" |
| 7.34 | "Company B" | 346.1 | "2016-07-10" |
| 3.59 | "Company C" | 54.9 | "2016-07-09" |
| 12.61 | "Company D" | 45.3 | "2016-07-08" |
| 89.43 | "Company E" | 89.6 | "2016-07-07" |
| 73.90 | "Company F" | 4.2 | "2016-07-06" |
| 9.28 | "Company G" | 90.1 | "2016-07-05" |
Numeric
http://knowledge.com/kpis#EarningsPerShareBasic
 [7, 3.59, 100.81, 8.31, 81.67, 12.61, 42.42, 43.47, 1889.27, NULL]
String
https://schema.org/legalName
 [7, "Latin", 10.71, 0.43, 0, 0, 0, NULL, "bank", 0]
Time series
http://knowledge.com/stock#ClosingPrice
 [7, 4.2, 346.1, 29, 89.8, 54.9, 91.8, 117, 13688, 13688, 1.7, 4.45, "2016-07-05", "2016-07-11"]

APPARATUS PROGRAM AND METHOD FOR DATA PROPERTY RECOGNITION

CROSS-REFERENCE TO RELATED APPLICATION

The application is based upon and claims the benefit of priority of prior German patent application no. 102016220771.7, filed Oct. 21, 2016, the entirety of which is herein incorporated by reference.

FIELD

This application lies in the field of data science, and in particular relates to the automation of reconciliation of data entries from multiple data sources.

BACKGROUND

Data scientists spend time organizing and cleaning data, which time could be better-spent on procedures such as modelling or data mining. Standardization bodies, such as the World Wide Web Consortium (W3C), have worked for many years on proposing formats and best practices to facilitate data publication and sharing. However, not all data providers publish their data according to standards. Moreover, most standards focus on the syntax of the data model and forget about the data semantics. This often results in semantic interoperability problems when data from different sources are exchanged and merged, e.g. when two datasets refer to the same data property using different names.

The identification of data properties in a dataset it is complex and time-consuming when proper metadata is not available.

SUMMARY

Embodiments include a data property recognition apparatus, comprising: a storage unit; a model data acquisition processor, configured to acquire a plurality of model sets of data entries, each individual model set of data entries being a plurality of data entries individually representing an identified property common to the model set of data entries and being of a data type common to the model set of data elements; a feature vector generation processor configured to receive an input set of data entries, to recognise a data type common to the input set of data entries from among a plurality of supported data types, to select a set of statistical characteristics representing the input set of data entries in dependence upon the recognised data type, to generate a value of each of the selected set of statistical characteristics from the input set of data entries, and to output a feature vector composed of the generated values of statistical characteristics; the model data acquisition processor being configured, for each of the acquired plurality of model sets of data entries, to submit the model set of data entries to the feature vector generation processor as an input set of data entries, to obtain the feature vector output by the feature vector generation processor, and to submit to the storage unit the feature vector in association with the identified property common to the model set of data entries; the storage unit being configured to store the submitted feature vectors in association with the respective identified property, as a reference set of feature vectors for comparison with a feature vector output by the feature vector generation processor for a query set of data entries for which an identity of a property commonly represented by the individual data entries is sought.

Advantageously, the data property recognition apparatus provides a repository of feature vectors which can be used to automate the recognition of data property identity in data sets. Therefore, combining data entries from multiple heterogeneous data sources (i.e. with different schema) can be performed with a reduced level of manual interaction. A feature vector is a unique representation of a data property, similar to a fingerprint for a human. The feature vector may be referred to as a data property fingerprint, because it provides a unique identifier for an identified data property. An identified data property is an attribute of a dataset, database, or data source. The purpose of the repository of feature vectors is to automate data property recognition based on data entry values with minimum input from humans.

The sets of data entries may be entries from labelled columns in a relational database, so that each column entries are acquired as a set of data entries, and the label identifies the property which the data entries commonly individually represent. Alternatively or additionally, the sets of data entries may be elements stored as objects in a graph database, with the objects being linked in the graph to subject entities by arcs sharing a common label, the common label identifying the property which the data entries commonly represent.

Rather than relying on semantic analysis of labels for properties in heterogeneous data sources, the reference set of feature vectors stored by the storage unit provides a means for statistical comparison of data behaviour in order to compare two sets of data entries, and to determine whether or not they are data entries representing the same properties. It is not necessary that the entities are the same—the data property recognition apparatus leverages the assumption that sets of data entries representing the same property, whether for the same, overlapping, or non-overlapping entities, will be better-matched in terms of statistical characteristics, than one of those sets of data entries will be matched with sets of data entries representing different properties.

The model sets of data entries are referred to as model to indicate that the relation between data entries and the property represented by the entries is to be replicated in data from other sources. That is to say, the relation between the semantic content of the identified property and the data entries is a model to which data sets from other sources can be compared and/or conformed.

Optionally, the data property recognition apparatus further comprises: a query processor, the query processor being configured to obtain a query set of data entries for which an identity of a property commonly represented by the individual data entries is sought, to submit the query set of data entries to the feature vector generation processor, to execute comparisons between the output feature vector and the stored reference set of feature vectors to identify a best match feature vector among the stored reference set of feature vectors for the output feature vector, to recognise the identified property stored in association with the best match feature vector as a recognised data property represented by the individual data entries in the query set of data entries, and to output the recognised data property.

Advantageously, the query processor is a mechanism to leverage the reference set of feature vectors to reconcile the query set of data entries with a set of data entries for which a feature vector appears in the reference set. The reconciliation in this context may be considered as an alignment of schema: by finding a best match between a feature vector generated for the query set of data entries and the feature vectors in the reference set, an identified property from among those stored in association with the reference set of feature vectors is recognised as an identified property to assign or attribute to the query set of data entries.

The output recognised data property may be output to a storage unit (for example, the storage unit in which the reference set of feature vectors is stored) for storage in association with the query set of feature vectors.

Embodiments including the query processor automate the process of recognising which data property is represented by the data entries in a set of data entries.

In particular, the query processor may be configured to submit to the storage unit the query set of data entries and the recognised data property; the storage unit being configured to store the query set of data entries in association with the recognised data property as a recognised set of data entries. Furthermore, the storage unit is configured to store the reference set of feature vectors in association with the respective identified property and in association with the respective model set of data entries for which the feature vector was generated.

Advantageously, the storage unit stores both the query set of data entries, and one (or more) of the model set of data entries in association with the same identified property. The data entries from the data source from which the model set of data entries were acquired and the data entries from the data source from which the query set of data entries were acquired are therefore stored in a reconciled manner in the storage unit.

Embodiments may also include a reference feature vector update processor, configured, upon submission of the recognised set of data entries stored in the storage unit, to compile a composite set of data entries comprising each of the reference set of data entries and each of the other recognised sets of data entries stored in association with the same identified property as the submitted recognised set of data entries, submitting the composite set of data entries to the feature vector generation processor, obtaining the feature vector output by the feature vector generation processor as an updated reference feature vector, and replacing the existing feature vector in the reference set of feature vectors stored in association with the identified property with the updated reference feature vector.

Advantageously, the updating of the feature vectors improves the quality of recognition with use of the reference set of feature vectors for recognition.

Optionally, the executed comparisons are between the output feature vector and each of the stored reference set of feature vectors, and the comparison comprises: comparing a data type of the set of data entries represented by the feature vector from the reference set with a data type of the query set of data entries represented by the output feature vector, and if the data types are different, excluding the feature vector from the reference set from mathematical comparison; and if the data types are the same, performing a mathematical comparison between the output feature vector and the feature vector from the reference set to obtain a similarity value; the feature vector for which the greatest similarity value is obtained being the best match feature vector.

The output feature vector is the feature vector generated for the query set of data entries. The composition of the feature vectors, that is, the statistical characteristics that they contain, may be peculiar to the data type, so that the feature vector may not explicitly specify a data type in order for the data type to be identifiable from the feature vector. Alternatively, it may be that the feature vector for a set of data entries does include an entry explicitly identifying the data type of the set of data entries.

Comparison of statistical characteristics within a feature vector is only executed between feature vectors representing sets of data entries of the same data type. Therefore, the comparison of data types can be considered to be a pre-processing step for the mathematical comparison.

The similarity value is the result of the mathematical comparison. The mathematical comparison may be, for example, a cosine distance comparison of the two feature vectors, generating a similarity value between 0 (minimum) and 1 (maximum).

Advantageously, the mathematical comparison of two vectors is a computationally efficient manner in which to compare two sets of data entries. The processing overhead of generating the feature vectors is repaid in the ease of comparison between the feature vector for the query set of data entries and the reference set of feature vectors. Therefore, embodiments are scalable over very large sets of reference vectors.

Composition of feature vectors in terms of statistical characteristics is dependent on implementation, and may be selected at design time, or by a user at run time via a user interface. Feature vectors may include data identifying which of the supported data types is the set of data entries for which the feature vector was generated. Embodiments may also store a record of, for each data type, which statistical characteristics are recorded in the feature vector and in which order. Such a record forms a feature vector schema.

Embodiments of another aspect include a data set reconciliation apparatus, comprising: a user interface to accept from a user a specification of a plurality of model sets of data entries from a first data source, and a specification of a plurality of query sets of data entries from further data sources; a data property recognition apparatus as defined in the claims, wherein the plurality of model sets of data entries and the plurality of model sets of data entries specified by the user, and further comprising: a data property reconciliation processor, configured to submit to the storage unit a copy of the first data source, and a copy of each of the further data sources, wherein the query sets of data entries for which a recognised data property was output by the query processor are stored in association with the respective recognised data property.

The data property reconciliation apparatus provides a mechanism for automating the reconciling of disparate heterogeneous data sources under a single reconciled schema. The storage unit becomes a data store which is accessible via a single access point, provided via a DBMS for the storage unit, and which processes access queries to the stored data utilising the single reconciled schema for the sets of data entries from the disparate data sources.

Embodiments of another aspect include a computer program which, when executed by a computing apparatus, causes the computing apparatus to function as a computing apparatus defined above as an invention embodiment.

Embodiments of another aspect include a method comprising: acquiring a plurality of model sets of data entries, each individual model set of data entries being a plurality of data entries individually representing an identified property common to the model set of data entries and being of a data type common to the model set of data elements, and for each of the acquired plurality of model sets of data entries as an input set of data entries, recognising a data type common to the input set of data entries from among plural supported data types, selecting a set of statistical characteristics representing the input set of data entries in dependence upon the recognised data type, generating a value of each of the selected set of statistical characteristics from the plurality of data entries, and outputting a feature vector composed of the generated values of statistical characteristics; for each of the acquired plurality of model sets of data entries, obtaining the output feature vector and submitting to the storage unit the output feature vector in association with the identified property common to the model set of data entries; storing the submitted feature vectors in association with the respective identified property, as a reference set of feature vectors for comparison with a feature vector generated for a query set of data entries for which an identity of a property commonly represented by the individual data entries is sought.

Embodiments of another aspect include a computer program which, when executed by a computing apparatus, causes the computing apparatus to perform a method defined above or elsewhere in this document as an invention embodiment.

Furthermore, embodiments of the present invention include a computer program or suite of computer programs, which, when executed by a plurality of interconnected computing devices, cause the plurality of interconnected computing devices to perform a method embodying the present invention.

Embodiments of the present invention also include a computer program or suite of computer programs, which, when executed by a plurality of interconnected computing devices, cause the plurality of interconnected computing devices to function as a computing apparatus defined above or elsewhere in this document as an invention embodiment.

BRIEF DESCRIPTION OF THE DRAWINGS

Preferred features of the present invention will now be described, purely by way of example, with reference to the accompanying drawings, in which:—

FIG. 6 illustrates an example of a feature vector generation process.

DETAILED DESCRIPTION

Figure 1:
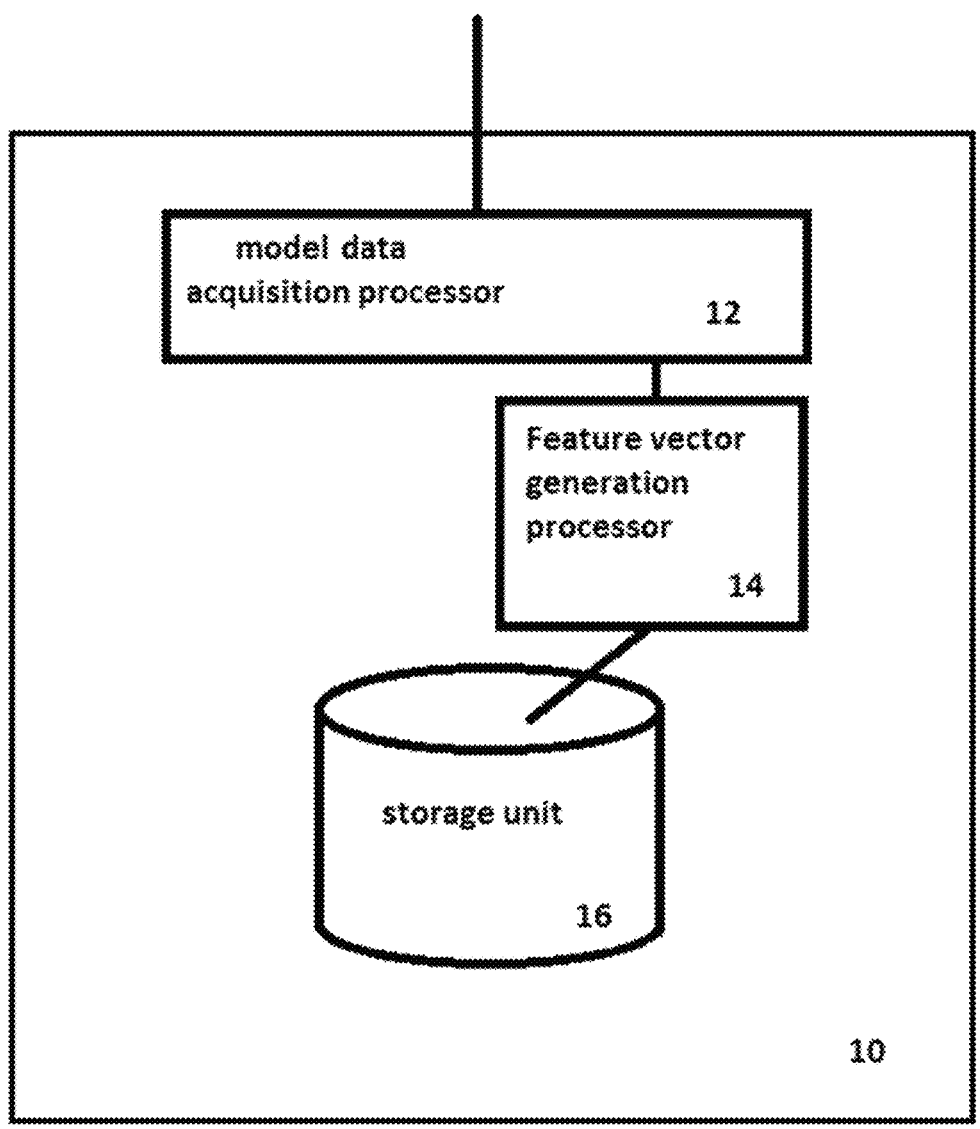
FIG. 1 illustrates a data property recognition apparatus.

FIG. 1 illustrates a data property recognition apparatus 10 of an embodiment. The data property recognition apparatus 10 comprises a model data acquisition processor 12, a feature vector generation processor 14, and a storage unit 16.

The model data acquisition processor is configured to acquire a plurality of model sets of data entries, each individual model set of data entries being a plurality of data entries individually representing an identified property common to the model set of data entries and being of a data type common to the model set of data entries. The plurality of model sets of data entries may be from a single data source, with the schema of the single data source identifying the property represented by the individual data values in each set. The illustrated line in FIG. 1 from the exterior of the data property recognition apparatus 10 to the model data acquisition processor 12 represents the import (acquiring) of model sets of data entries from a data source by the model data acquisition processor 12.

The model data acquisition processor 12 is configured to access a data source in which the plurality of model sets of data entries are respectively stored, to read the plurality of sets of data entries and schema identifying a property represented by the individual data values in each set, and submit the read data to the feature vector generation processor 14 and/or the storage unit 16 for processing. The illustrated line linking the model data acquisition processor 12 and the feature vector recognition processor 14 represents the submission of the model sets of data entries to the feature vector generation processor 14.

The identified property common to the model set of data entries may be a label for a column of data entries in a relational database or a label of commonly labelled edges in a graph database. In either case, the label may itself contain the semantic data (i.e. a string) defining the identified property, or may provide a link to an element of a knowledge model at which semantic data defining the identified property can be found. In either case, the property is identified, whether it be directly (by semantic data), or indirectly (via a link to a knowledge model element containing the semantic data). Either the link or the explicit label may be acquired by the model data acquisition processor 12 as the identified property.

A user may specify to the model data acquisition processor a data source or subset of data within a data source to acquire as the plurality of model sets of data entries. A prerequisite is that there are sufficient data entries in each set for statistical characteristics to be calculated by the feature vector generator processor 14. For example, a minimum number of data entries may be imposed by the model data acquisition processor 12, wherein if a set of data entries to be acquired has below the minimum number, a warning is issued to the user and/or the set of data entries is not acquired. The minimum number may be, for example, 2, 5, 10, 50, 100 or 200.

A further prerequisite is that the data entries in each model set of data entries are of a common data type, and that the data type is one of defined list. Depending on the implementation, either the model data acquisition processor 12 or the feature vector generation processor 14 may be responsible for rejecting (i.e. excluding from further processing and removing from the storage unit 16) any sets of data entries that are not of a common data type and of a data type other than from the defined list of supported data types. The defined list of supported data types is: numeric, string, and numerical time-series. The specific format can vary within the specified type, so that, for example, numerical may be single-precision floating point format, double-precision floating point format, integers, decimals, etc. Numerical time-series data entries are tuples comprising a numeric value and a time/date value. String data entries are a single value, as are numeric data entries.

The feature vector generation processor 14 only proceeds to generate a feature vector for input sets of data entries that are of a common data type and specifically are of a common data type from the defined list of supported data types.

The feature vector generation processor 14 is configured to receive an input set of data entries, to recognise the data type common to the set of data entries from among plural supported data types, to select a set of statistical characteristics representing the input set of data entries in dependence upon the recognised data type, to generate a value of each of the selected set of statistical characteristics from the plurality of data entries, and to output a feature vector composed of the generated values of statistical characteristics, the plural supported data types comprising numbers, strings, and numerical time-series.

The model data acquisition processor 12 is further configured, for each of the acquired plurality of model sets of data entries, to submit the model set of data entries to the feature vector generation processor 14 as an input set of data entries, to obtain the feature vector output by the feature vector generation processor 14, and to submit to the storage unit 16 the feature vector in association with the identified property common to the model set of data entries. The illustrated line joining the feature vector generation processor 14 and the storage unit 16 represents the submission of the feature vector to the storage unit.

The feature vector generation processor 14 includes processing logic for generating values for statistical characteristics from input sets of data entries. The statistical characteristics of which values are to be included in a feature vector for a set of data entries is dependent upon the data type of the data entries. Hence, the selection of which processing logic, that is to be executed by the feature vector generation processor in transforming the input set of data entries into a feature vector composed of values of a selected set of statistical characteristics, is dependent upon the data type of the data entries.

The feature vector generation processor 14 takes a list of data entries (which may also be referred to as data values or data entry values) belonging to any of supported types (numbers, strings, numerical time-series) and creates a feature vector. A feature vector contains a value for each one of a set of statistical characteristics of the data entries representing an identified data property. The membership of the individual sets of statistical characteristics is detailed below.

The set of statistical characteristics for an input set of data entries recognised as being of the number type, comprises two or more from among the following:
  number of data entries;
  minimum value;
  maximum value;
  first quartile value;
  third quartile value;
  median value;
  mean;
  standard deviation;
  variance;
  most repeated data entry.

The set of statistical characteristics for an input set of data entries recognised as being of the string type, comprises two or more from among the following:
  number of data entries;
  alphabet of data entries;
  average number of characters per data entry;
  average number of white spaces per data entry;
  average number of full stops per data entry;
  average number of commas per data entry;
  average number of semicolons per data entry;
  most repeated data entry;
  longest common substring;
  percentage of unique entries.

The set of statistical characteristics for an input set of data values recognised as being of the string type, comprises two or more from among the following:
  number of data values;
  number of entries;
  minimum numerical value;
  maximum numerical value;
  first quartile numerical value;
  third quartile numerical value;
  median numerical value;
  mean of numerical values;
  standard deviation;
  variance;
  covariance;
  skewness;
  kurtosis;
  start date;
  end date.

The membership of the set of statistical characteristics for a data type is respectively fixed per-implementation, so that in a particular data property recognition apparatus operating on a particular task, project, or group of data sources, the feature vector generation processor 14 is configured to generate values of the same statistical characteristics for input data sets of a given data type. In this manner, the feature vectors for the data type are comparable in the implementation.

Figure 3:
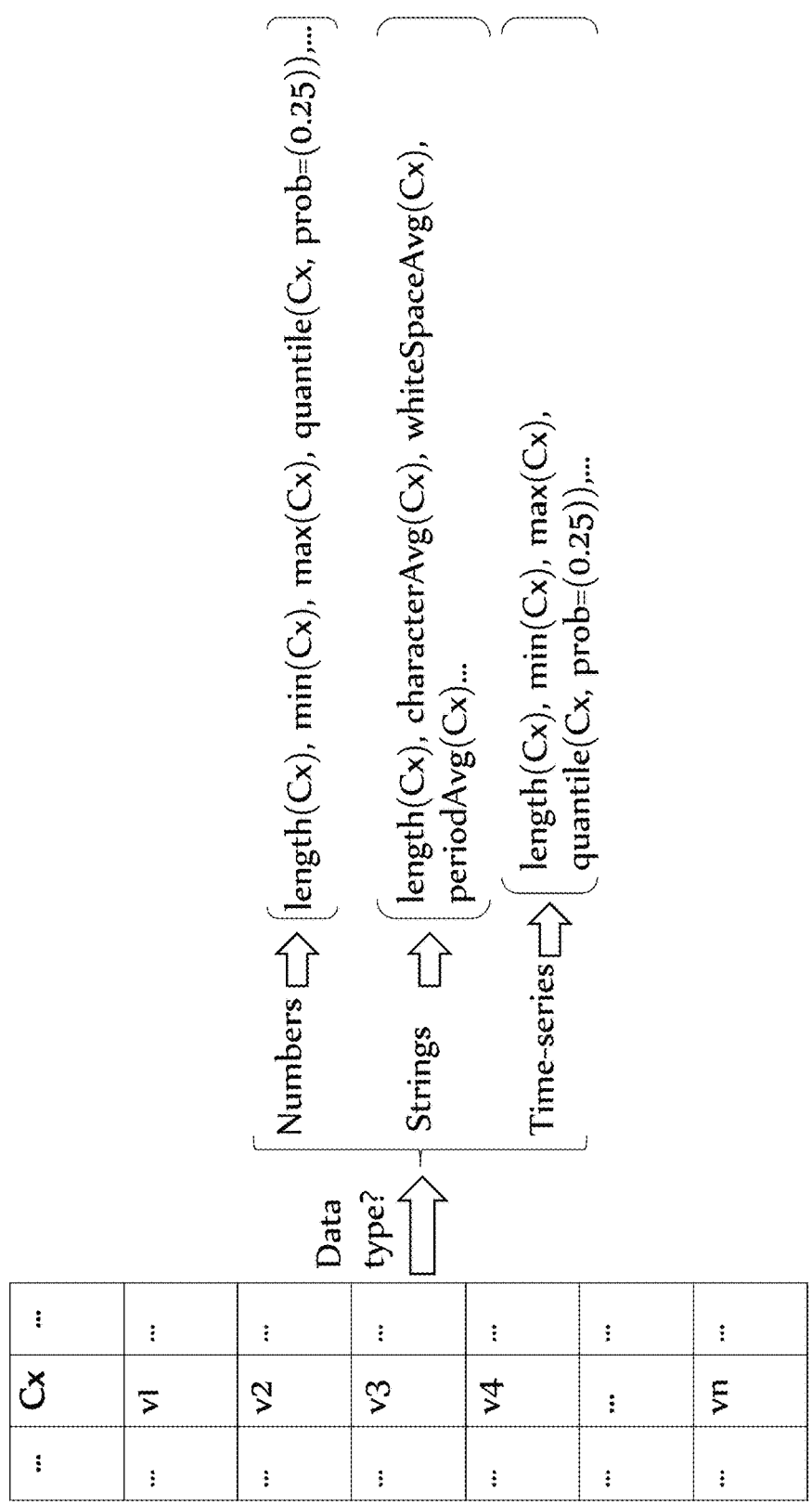
FIG. 3 illustrates a feature vector generation process.

FIG. 3 is a schematic representation of the functionality of the feature vector generation processor. An initial step of the procedure followed by the feature vector generation processor 14 is to identify the data type of the values in a set of data entries input to the feature vector generator. Algorithms are available for this initial step. Once the data type among the plurality of supported data types is identified, processing logic for calculating the statistical characteristics belonging to the set of statistical characteristics for the identified data type is executed, and the output stored in a feature vector for storage in association with an identification of the property represented by the entries in the input data set.

Once the reference set of feature vectors are generated and stored in the storage unit 16, they are utilised to automate the recognition of a data property represented by data entries in a query set of data entries. Upon recognition, the query set is submitted to the data storage for storage as a recognised set of data entries in association with an identification of the recognised data property.

The feature vector generation processor may further comprise a reference feature vector update processor, configured, upon submission of the recognised set of data entries stored in the storage unit, to compile a composite set of data entries comprising each of the reference set of data entries and each of the other recognised sets of data entries stored in association with the same identified property as the submitted recognised set of data entries, submitting the composite set of data entries to the feature vector generation processor as an input set of data entries, obtaining the feature vector output by the feature vector generation processor as an updated reference feature vector, and replacing the existing feature vector in the reference set of feature vectors stored in association with the identified property with the updated reference feature vector The feature vectors generated by the feature vector generation processor 14 for the plurality of model sets of data entries serve as a basis for comparison with data sets for which an identity of a data property represented by the component data entries is sought. Therefore, it may be that the plurality of model sets of data entries are selected by a user, for example, wishing to replicate the schema of the plurality of model sets of data entries in other data sources of unknown or unidentifiable schema.

The storage unit 16 is configured to store the submitted feature vectors in association with the respective identified property. In addition, and in association with the feature vector and the respective identified property (identified explicitly or via a link to a knowledge base element), the storage unit 16 may store the set of data entries for which the feature vector was generated, for example, in the form they appear in the data source from which they are acquired. The set of data entries and the respective identified property may be submitted to the storage by the model data acquisition processor, so that when the feature vector has been generated and output by the feature vector generation processor 14, it can be associated with the set of data entries and the respective identified property in the storage unit 16.

Thus, the storage unit 16 is functional as a repository for storing feature vectors that store a statistical representation or fingerprint of a set of data entries, in association with an identified property that is represented by the data entries. The feature vectors are functional as a reference set of feature vectors for comparison with a feature vector output by the feature vector generation processor for a query set of data entries for which an identity of a property commonly represented by the individual data entries is sought. A property commonly represented by the individual data entries in such a query set of data entries may be sought because it is unknown, or because the schema of the data source from which the query set of data entries is acquired is undesirable to an apparatus user, for example, because it is heterogeneous with a required or model data schema. Inconsistencies in semantic expression between sets of data entries from disparate data sources is overcome, by comparing sets of data based on statistical features rather than semantic expression of a property represented by the data entries.

Figure 4:
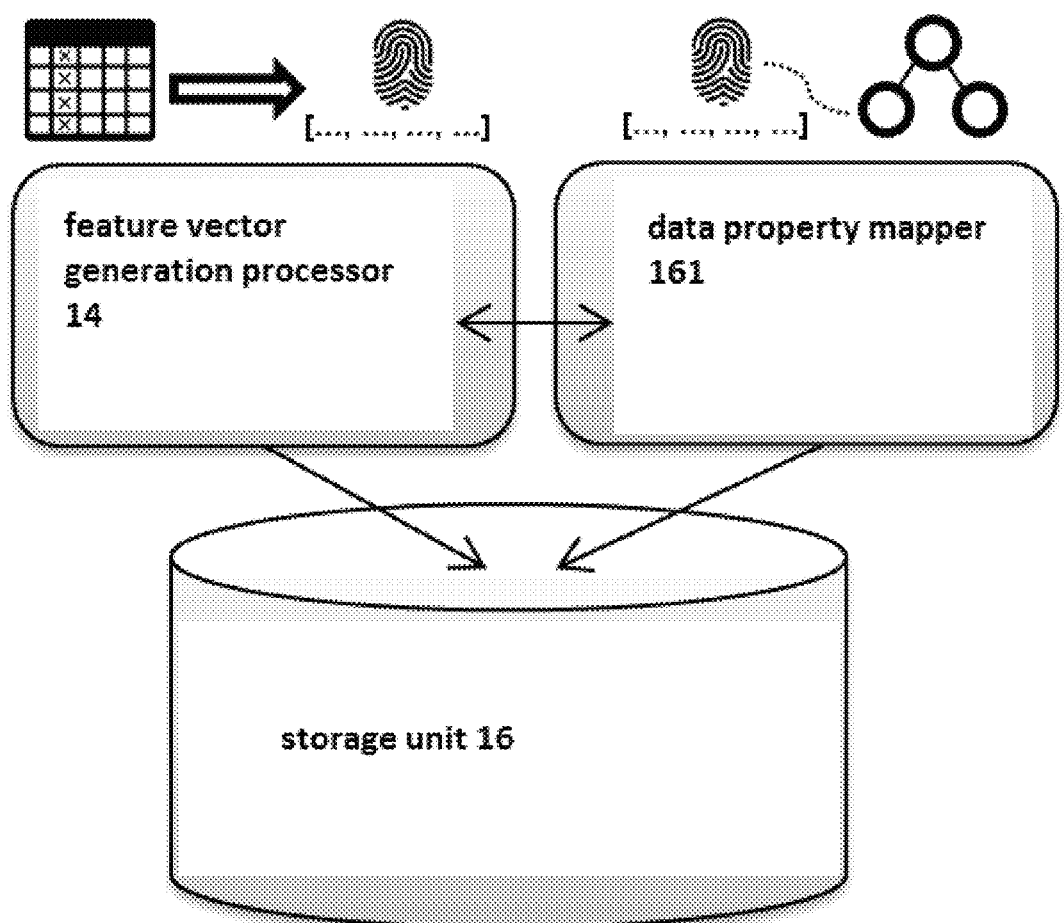
FIG. 4 illustrates part of a data property recognition apparatus.

As illustrated in FIG. 4, a dedicated data property mapper 161 may store the associations between feature vectors and identified property.

The model data acquisition processor 12 may utilise the storage unit 16 for temporary storage of acquired data sets whilst waiting to submit the acquired data sets to the feature vector generator processor 14.

Figure 2:
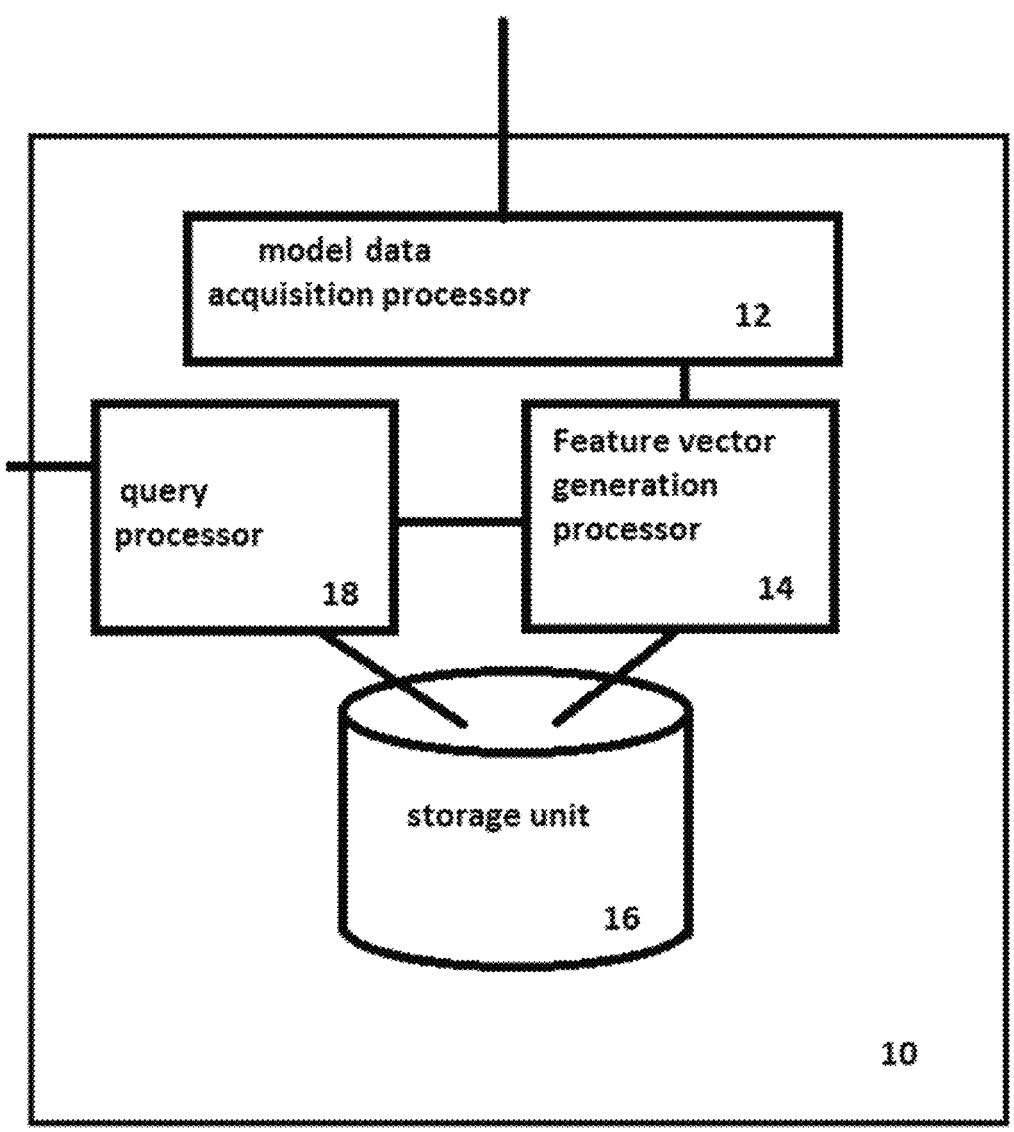
FIG. 2 illustrates a data property recognition apparatus.

FIG. 2 illustrates an embodiment. In FIG. 2, the data property recognition apparatus 10 is as described with relation to FIG. 1, and further comprises a query processor 18. The query processor 18 is configured to obtain a query set of data entries for which an identity of a property commonly represented by the individual data entries is sought, to submit the query set of data entries to the feature vector generation processor, to execute comparisons between the output feature vector and the stored reference set of feature vectors to identify a best match feature vector among the stored reference set of feature vectors for the output feature vector, to recognise the identified property stored in association with the best match feature vector as a recognised data property represented by the individual data entries in the query set of data entries, and to output the recognised data property.

The query processor 18 is a mechanism that utilises the reference set of feature vectors stored by the storage unit 16 in order to provide an automated process for recognising a data property represented by a query set of data entries. The scope for recognition is limited to data property identities associated with reference sets of data entries of the same data type as the query set. Hence, the data property recognition apparatus 10 is of enhanced effectiveness if the property represented by entries in the query set is a property represented by entries from a model set of data entries.

A user of the apparatus may specify one or more data sources, and optionally subsets of data entries within those data sources, that are to be obtained and processed by the query processor. For example, the user may wish to reconcile several disparate data sources, and is able to identify one of those data sources as having a schema according to which the reconciled data is to be stored. The data of the identified one of the data sources is acquired and processed by the model data acquisition processor, and the schema stored as identified properties associated with respective members of the reference set of feature vectors in the storage unit 16. The remaining data sources, which may be partially or wholly overlapping with the identified one of the data sources in terms of either or both properties (columns in relational DB) and entities (rows in relational DB) represented, are then obtained and processed by the query processor. The query data set is stored in association with the recognised data property in the reconciled data set.

The apparatus of FIG. 2 may be included as part of a data set reconciliation apparatus, in which the query processor is used to obtain sets of data entries to be stored in the storage unit under the schema of the model sets of data entries. For example, there may be multiple data sources describing the same or overlapping properties of the same or overlapping entities as each other. The query processor is configured to submit to the storage unit the query set of data entries and the respective recognised data property, and the storage unit is configured to store the query set of data entries in association with the recognised data property as a recognised set of data entries. The model set of data entries and the recognised set of data entries stored in association with the same identified property are reconciled in the storage unit by virtue of their respective associations with the same identified property.

FIG. 3 illustrates a data storage arrangement in embodiments. The embodiment illustrated in FIG. 3 is an extension of the FIG. 1 & FIG. 2 embodiments. The data acquisition processor 12 is omitted from illustration in FIG. 3, but is included in the embodiment. Optionally, the query processor may also be included.

FIG. 4 illustrates a particular data storage arrangement in which a dedicated data property mapper 161 stores the associations between feature vectors in the storage unit 16 and identified data properties. The data property mapper 161 links each feature vector to an identification of the data property represented by the data entries in the set of data entries for which the feature vector was generated. The identification may be an explicit definition in the storage unit 16, or may be an external knowledge representation. The external knowledge representation may be a concept represented in a data graph.

The data property mapper 161 handles the relationship between a feature vector and an identification of the property that is represented by the data entries for which the feature vector was generated. The property is a named concept that semantically represents the data content, as exemplified in FIG. 5. The relationship stored by the data property mapper 161 represents a semantic annotation of the feature vector. The relationship may be mapped by a user via a user interface. Alternatively, the identification of the property may be a label read from the data source from which the respective model set of data values was acquired by the model data acquisition processor 12.

Figure 5:
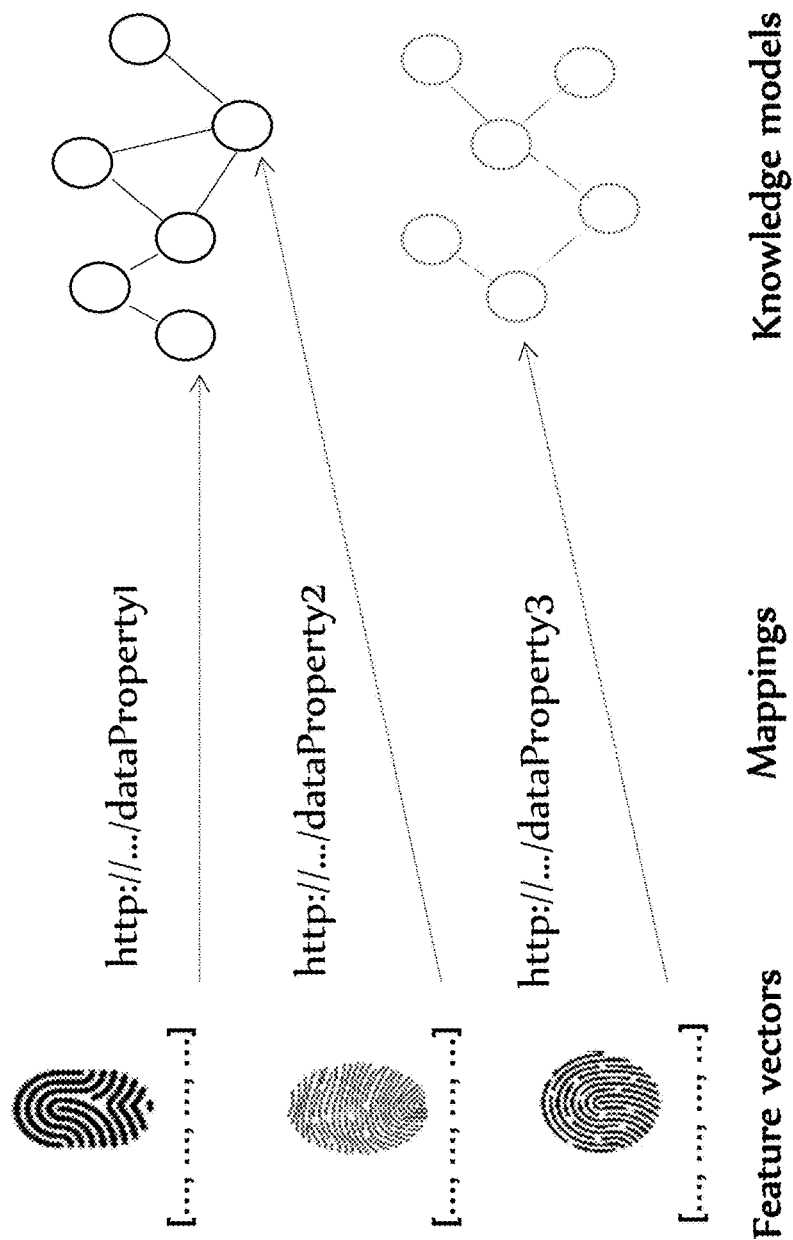
FIG. 5 illustrates a mapping between feature vectors and identified data properties.

FIG. 5 illustrates the relationship between external knowledge model, mappings in the data property mapper 161, and feature vectors in the storage unit 16. The external knowledge model may be linked to via a URL (uniform resource locator) or URI (uniform resource identifier) that points to the concept within a knowledge model semantically describing the data property. If the knowledge model is not available online, the storage unit 16 may store the whole model as an RDF serialization, for example, in Turtle format. Thus, the link stored by the data property mapper may be to an external knowledge model or to a knowledge model stored by the storage unit 16.

FIG. 6 illustrates three examples of sets of data entries as they appear in the data source from which they are acquired, and the feature vector generated in each case. The table illustrates three different sets of data entries in a column labelled "Earnings per share", one in a column labelled "Name", and one in a column labelled "Closing price". The feature vector generation processor 14 identifies the data type of the "Earnings per share" column as numeric, and calculates values for a set of statistical characteristics accordingly (number of data entries; minimum value; maximum value; first quartile value; third quartile value; median value; mean; standard deviation; variance; most repeated data entry). The feature vector generation processor 14 identifies the data type of the "Name" column as string, and calculates values for a set of statistical characteristics accordingly (number of data entries; alphabet of data entries; average number of characters per data entry; average number of white spaces per data entry; average number of full stops per data entry; average number of commas per data entry; average number of semicolons per data entry; most repeated data entry; longest common substring; percentage of unique entries). The feature vector generation processor 14 identifies the data type of the "Closing price" column as numerical time-series, and calculates values for a set of statistical characteristics accordingly (number of entries; minimum numerical value; maximum numerical value; first quartile numerical value; third quartile numerical value; median numerical value; mean of numerical values; standard deviation; variance; covariance; skewness; kurtosis; start date; end date). In each case, a link to a knowledge model is determined either by an automated process of searching based on the column heading, or by requesting input of a link to a knowledge model from a user via a user interface. Sample links are illustrated.

Figure 7:
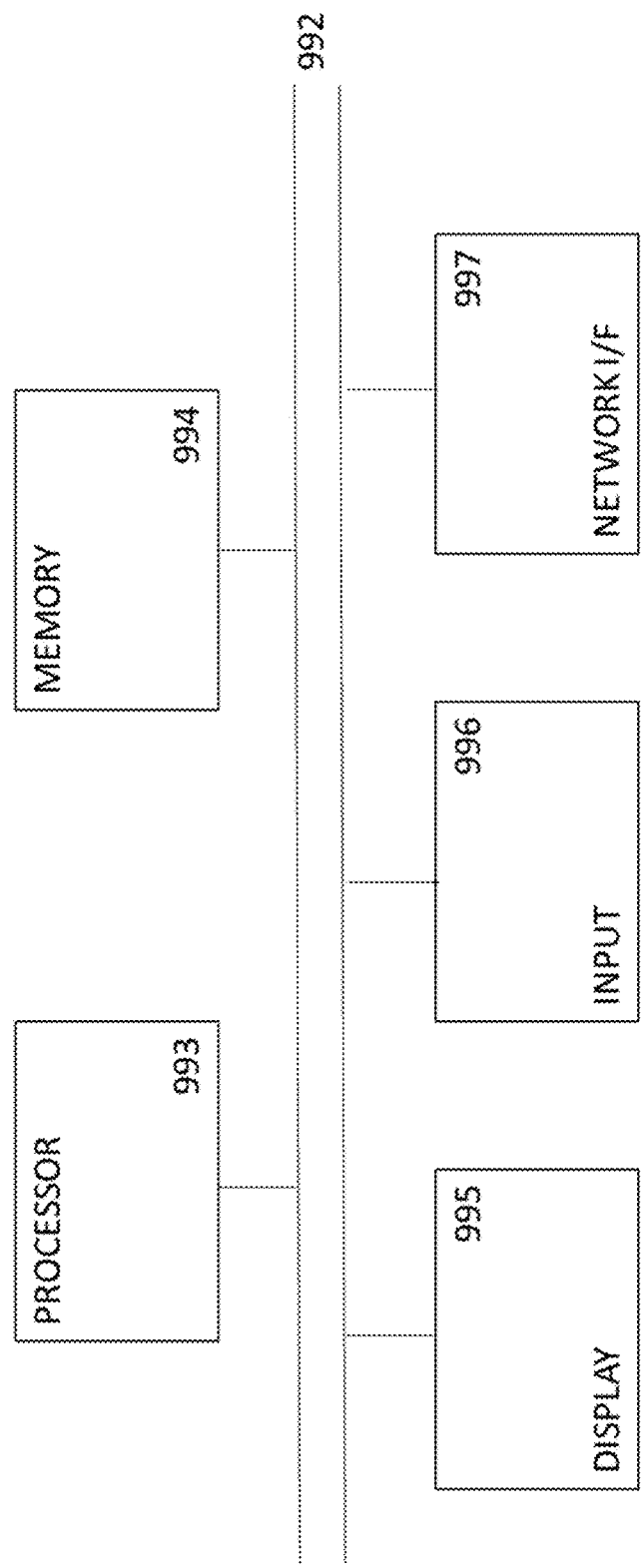
FIG. 7 illustrates a hardware configuration of embodiments.

FIG. 7 illustrates a hardware configuration of an embodiment. In the example of FIG. 7, the hardware is a computing apparatus. Methods embodying the present invention may be carried out on a computing device such as that illustrated in FIG. 7. Such a computing device need not have every component illustrated in FIG. 7, and may be composed of a subset of those components. A method embodying the present invention may be carried out by a single computing device in communication with one or more data storage servers via a network, the data storage servers operating as the storage unit 16. The computing device may be a data storage itself storing the reference feature vectors and other data stored by the storage unit 16, that is to say, the computing device may include the storage unit 16.

A method embodying the present invention may be carried out by a plurality of computing devices operating in cooperation with one another. One or more of the plurality of computing devices may be a data storage server storing at least a portion of the reference feature vectors and respective associated identified data properties and sets of data entries.

FIG. 7 is a block diagram of a computing apparatus, such as a data storage server, which embodies the present invention, and which may be used to implement a method of an embodiment. The computing device comprises processor hardware 993, and memory, 994. Optionally, the computing device also includes a network interface 997 for communication with other computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor hardware 993 is configured to control the computing device and execute processing operations, for example executing code stored in the memory to implement the various different functions of functional processors described here and in the claims. The memory 994 stores data being read and written by the processor hardware 993. As referred to herein, processor hardware may include one or more general-purpose processing devices such as a microprocessor, central processing unit, or the like. The processor hardware may include a complex instruction set computing (CISC) microprocessor, reduced instruction set computing (RISC) microprocessor, very long instruction word (VLIW) microprocessor, or processor hardware implementing other instruction sets or processors implementing a combination of instruction sets. The processor hardware may also include one or more special-purpose processing devices such as an application specific integrated circuit (ASIC), a field programmable gate array (FPGA), a digital signal processor (DSP), network processor, or the like. In one or more embodiments, processor hardware is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The model data acquisition processor 12 of FIGS. 1 to 4 may be processor hardware 993 (or plurality thereof) executing processing instructions (a program) stored on a memory 994 and exchanging data via a network I/F 997. In particular, the processor hardware 993 executes processing instructions to receive, via the network I/F, a plurality of model sets of data entries from a data source external to the data property recognition apparatus and to process the acquired data by submitting the individual model sets of data entries to the feature vector generation processor, and receiving the resultant feature vectors. Furthermore, the processor hardware 993 may execute processing instructions to store the received feature vectors generated for the model sets of data entries on a connected storage unit 16 as a reference set of feature vectors.

The feature vector generation processor 14 of FIGS. 1 to 4 may be processor hardware 993 (or plurality thereof) executing processing instructions (a program) stored on a memory 994. In particular, the processor hardware 993 executes processing instructions to receive, from the model data acquisition processor, the reference feature vector update processor, or the query processor, an input set of data entries and transform the input set of data entries into a feature vector, as illustrated in FIG. 3, for example. Furthermore, the processor hardware 993 may execute processing instructions to respond to the functional processor from which the input set of data entries was received by outputting the generated feature vector either for storage on a connected storage unit 16 and/or for further processing, such as recognition processing by the query processor.

The storage unit 16 of FIGS. 1 to 4 is a single data storage device or multiple cooperating data storage devices, and includes a DBMS controlling read/write access operations. The storage unit 16 is configured to store the feature vectors, the associated identified properties, and the data entries from which the feature vectors were generated.

The query processor 18 of FIGS. 2 to 4 may be processor hardware 993 (or plurality thereof) executing processing instructions (a program) stored on a memory 994 and exchanging data via a network I/F 997. In particular, the processor hardware 993 executes processing instructions to receive, via the network I/F, a query set of data entries from a data source to be reconciled with the data source from which the model sets of data entries were acquired, to obtain a feature vector for the query set, and to compare the obtained feature vector with the reference set of feature vectors to find a best match. Furthermore, the processor 993 may execute processing instructions to store the query set of data entries on the connected storage unit 16 in association with the identified data property stored in association with the best match from among the reference set of feature vectors.

The invention claimed is:

1. A data set reconciliation apparatus, comprising a processor, a memory, and a user interface, wherein:
   the user interface is configured to accept from a user a specification of a plurality of model sets of data entries from a first data source, and a specification of a plurality of query sets of data entries from further data sources, the first data source and the further data sources being disparate data sources with heterogeneous schema; and
   the processor is configured to perform a process including:
   acquiring the plurality of model sets of data entries specified by the user, each individual model set of data entries being a plurality of data entries individually representing an identified property common to the model set of data entries and being of a data type common to the model set of data elements;
   for each of the acquired plurality of model sets of data entries as an input set of data entries, recognising a data type common to the input set of data entries from among plural supported data types, selecting a set of statistical characteristics representing the input set of data entries in dependence upon the recognised data type, generating a value of each of the selected set of statistical characteristics from the plurality of data entries, and outputting a feature vector composed of the generated values of statistical characteristics;
   for each of the acquired plurality of model sets of data entries, obtaining the output feature vector and submitting to the memory the output feature vector in association with the identified property common to the model set of data entries;
   storing, in the memory, the submitted feature vectors in association with the respective identified property, as a reference set of feature vectors;
   obtaining the plurality of query sets of data entries from the further data sources specified by the user;
   recognising a data type common to the query set of data entries from among plural supported data types, selecting one of the sets of statistical characteristics representing input sets of data entries in dependence upon the recognised data type of the query set of data entries, generating a value of each of the selected set of statistical characteristics from the query set of data entries, and outputting a feature vector composed of the generated values of statistical characteristics;
   executing comparisons between the feature vector output for the query set of data entries and the stored reference set of feature vectors to identify a best match feature vector among the stored reference set of feature vectors for the feature vector output for the query set of data entries, recognising the identified property stored in association with the best match feature vector as a recognised data property, from the first data source specified by the user, represented by the individual data entries in the query set of data entries, from the further data source specified by the user, and outputting the recognised data property; and
   submitting, to the memory, for storage in a data store accessible via a single database management system, a copy of the first data source and a copy of each of the further data sources, wherein the query sets of data entries from the further data sources, for which a recognised data property was output by the processor, are stored in association with the respectively output recognised data property.

2. The data set reconciliation apparatus according to claim 1, further comprising:
   a query processor, the query processor being configured to obtain a query set of data entries for which an identity of a property commonly represented by the individual data entries is sought, to submit the query set of data entries to the feature vector generation processor, to execute comparisons between the output feature vector and the stored reference set of feature vectors to identify a best match feature vector among the stored reference set of feature vectors for the output feature vector, to recognise the identified property stored in association with the best match feature vector as a data property represented by the individual data entries in the query set of data entries, and to output the recognised data property.

3. The data set reconciliation apparatus according to claim 1, wherein
the set of statistical characteristics for an input set of data entries recognised as being of the numeric type, comprises two or more from among the following:
number of data entries;
minimum value;
maximum value;
first quartile value;
third quartile value;
median value;
mean;
standard deviation;
variance; and
most repeated data entry.

4. The data set reconciliation according to claim 1, wherein
the set of statistical characteristics for an input set of data entries recognised as being of the string type, comprises two or more from among the following:
number of data entries;
alphabet of data entries;
average number of characters per data entry;
average number of white spaces per data entry;
average number of full stops per data entry;
average number of commas per data entry;
average number of semicolons per data entry;
most repeated data entry;
longest common substring; and
percentage of unique entries.

5. The data set reconciliation apparatus according to claim 1, wherein
the set of statistical characteristics for an input set of data values recognised as being of the numerical time-series type, comprises two or more from among the following:
number of data values;
number of entries;
minimum numerical value;
maximum numerical value;
first quartile numerical value;
third quartile numerical value;
median numerical value;
mean of numerical values;
standard deviation;
variance;
covariance;
skewness;
kurtosis;
start date; and
end date.

6. The data set reconciliation apparatus according to claim 1, wherein
the plurality of supported data types comprises numeric, string, and numerical time-series.

7. The data set reconciliation apparatus according to claim 2, wherein
the query processor is configured to submit to the storage unit the query set of data entries and the recognised data property, and
the storage unit being configured to store the query set of data entries in association with the recognised data property as a recognised set of data entries.

8. The data set reconciliation apparatus according to claim 7, wherein
the storage unit is configured to store the reference set of feature vectors in association with the respective identified property and in association with the respective model set of data entries for which the feature vector was generated.

9. The data set reconciliation according to claim 7, wherein
the executed comparisons are between the output feature vector and each of the stored reference set of feature vectors, and the comparison comprises:
comparing a data type of the set of data entries represented by the feature vector from the reference set with a data type of the query set of data entries represented by the output feature vector;
if the data types are different, excluding the feature vector from the reference set from mathematical comparison; and
if the data types are the same, performing a mathematical comparison between the output feature vector and the feature vector from the reference set to obtain a similarity value,
the feature vector for which the greatest similarity value is obtained being the best match feature vector.

10. The data set reconciliation apparatus according to claim 8, further comprising:
a reference feature vector update processor, configured, upon submission of the recognised set of data entries stored in the storage unit, to compile a composite set of data entries comprising each of the reference set of data entries and each of the other recognised sets of data entries stored in association with the same identified property as the submitted recognised set of data entries, submitting the composite set of data entries to the feature vector generation processor, obtaining the feature vector output by the feature vector generation processor as an updated reference feature vector, and replacing the existing feature vector in the reference set of feature vectors stored in association with the identified property with the updated reference feature vector.

* * * * *